US009763543B2

(12) United States Patent
Wang et al.

(10) Patent No.: US 9,763,543 B2
(45) Date of Patent: Sep. 19, 2017

(54) FOOD PROCESSOR WITH A DICING FUNCTION (71) Applicant: Elec-Tech International Co., Ltd., Zhuhai, Guangdong (CN)

(72) Inventors: Tony Wang, Zhuhai (CN); Xuejun Chen, Zhuhai (CN); Jianwei Chen, Zhuhai (CN)

(73) Assignee: ELEC-TECH INTERNATIONAL CO., LTD. (CN)

( * ) Notice: Subject to any disclaimer, the term of this patent is extended or adjusted under 35 U.S.C. 154(b) by 534 days.

(21) Appl. No.: 14/450,516

(22) Filed: Aug. 4, 2014

(65) Prior Publication Data

US 2015/0144721 A1 May 28, 2015

(30) Foreign Application Priority Data

Nov. 28, 2013 (CN) ...................... 2013 2 0775239 U (51) Int. Cl.
*A47J 43/00* (2006.01)
*A47J 43/07* (2006.01)
*A47J 43/044* (2006.01)

(52) U.S. Cl.
CPC ......... *A47J 43/0722* (2013.01); *A47J 43/044* (2013.01); *A47J 43/0705* (2013.01)

(58) Field of Classification Search
CPC ................ A47J 43/0722; A47J 43/0716; A47J 43/0705; A47J 43/04; A47J 43/044; A47J 43/046
USPC ........................................................ 241/92
See application file for complete search history.

(56) References Cited

U.S. PATENT DOCUMENTS

| 8,051,769 | B2* | 11/2011 | Conti | A47J 43/0711 241/166 |
| 8,122,820 | B2* | 2/2012 | Conti | A47J 43/0711 241/101.01 |
| 8,701,531 | B2* | 4/2014 | Beber | A47J 43/0716 83/13 |
| 9,167,938 | B2* | 10/2015 | Benoit | A47J 43/0705 |
| 9,254,064 | B2* | 2/2016 | Unteregger | B26D 1/28 |
| 2010/0154660 | A1* | 6/2010 | Beber | A47J 43/0711 99/537 |
| 2011/0049279 | A1* | 3/2011 | Beber | A47J 43/0716 241/88 |

(Continued)

*Primary Examiner* — Faye Francis
(74) *Attorney, Agent, or Firm* — Colin P. Cahoon; Shaukat A. Karjeker; Carstens & Cahoon, LLP (57) ABSTRACT Provided is a food processor with a dicing function, including a driving device and a dicing assembly; the dicing assembly includes a main body, a lid, a driving axle, an annular supporting body and a dicing knife component; and a mesh shaper is disposed on the annular supporting body; the dicing knife component is rotatably disposed on the annular supporting body and is coupling connected to the driving axle; an annular flange of the annular supporting body is extended towards the lid in direction of a central axis of the driving axle, and a limiting groove is disposed on an inner surface of the annular flange; a radial outer end of the dicing knife component is capable of sliding inside the limiting groove. The food processor with a dicing function of the present disclosure has advantages of higher limit precision for cutting, better effect for dicing, and lower noise.

18 Claims, 7 Drawing Sheets (56) References Cited

U.S. PATENT DOCUMENTS

| | | | |
|---|---|---|---|
| 2012/0018559 A1* | 1/2012 | Conti | A47J 43/0711 241/152.2 |
| 2013/0134247 A1* | 5/2013 | Berzelak | A47J 43/07 241/86 |
| 2014/0110513 A1* | 4/2014 | Gushwa | B26D 1/29 241/101.4 |
| 2014/0203130 A1* | 7/2014 | Unteregger | B26D 1/28 241/282.1 |
| 2014/0209722 A1* | 7/2014 | Unteregger | A47J 43/07 241/30 |
| 2014/0246529 A1* | 9/2014 | Kobos | A47J 43/07 241/100 |

* cited by examiner

FOOD PROCESSOR WITH A DICING FUNCTION

CROSS-REFERENCE TO RELATED APPLICATIONS

This application claims priority to Chinese Application No 201320775239.7, "Food Processor with Dicing Function", filed on Nov. 28, 2013, which is hereby incorporated by reference in its entirety.

TECHNICAL FIELD

The present disclosure relates to kitchen utensils, and more particularly to a food processor with a dicing function.

BACKGROUND ART

At present, a food processor with a dicing function usually includes: a driving device, a main body, a pushing bar, and a lid; the lid has a feeding channel extending upwards, and has an axle sleeve fixedly disposed at the position of a central axis of the main body; a driving axle is provided along the central axis of the main body, the driving axle is detachably connected to a driving device, and a dicing component assembly is disposed on an upper part of the driving axle. The dicing component assembly includes: a supporting body, which is fixedly disposed on the upper part of the main body, and has a central hole at the position of a central axis of the supporting body, and as mesh shaper is disposed on the supporting body; and a dicing knife component, which is disposed on the supporting body, a knife surface of the dicing knife component intersects with a plane which is perpendicular to the axial axis at a tilted angle. One end of the driving axle passes through the central hole of the supporting body, and is detachably connected to the dicing knife component. The dicing knife component rotates along with rotation of the driving axle.

In the prior art, the upper end of the dicing knife component is upper and lower limited by the axle sleeve of the lid. Alternatively, another kind of prior art dicing knife component has an annular swivel plate and a clasp disposed on the supporting body; the clasp is rotatably fixed to the supporting body by a screw or in other manners, and the annular swivel plate is limited by the clasp. Since there is a gap between the knife edge and the mesh shaper, an axial force will be generated by foods on the mesh shaper under pressure from the rotation of the dicing knife component, the axial force can make the dicing knife component axially move, and the amplitude of the axially move is limited by structures of the supporting body, the main body and the lid; therefore, the supporting body the main body and the lid are required to have a certain precision. Because the limiting is affected by many components having large sizes, the precision requirement for the amplitude of axially move can not be ensured in the prior art, thereby the dicing knife component can not be limited accurately, the dicing knife component is either too tight or too loose. When it is limited by the clasp, the same problems exist. When the dicing knife component is too tight, with high-speed revolution of the dicing knife component, a great frictional force will be generated between the dicing knife component and the supporting body, and between the dicing knife component and other limiting elements, as a result, hot melting may occur, the motor may be locked-rotor, stressed parts may be fractured, and the service life is shortened; when the dicing knife component is too loose, the rotating amplitude of the dicing knife component is rather large and an unbearable noise will be generated, and the dicing effect is poor. The prior art food processor is complex in structure and is inconvenient to operate.

SUMMARY OF THE INVENTION

In view of the defects existing in the prior art, the present disclosure provides a food processor with a dicing function, which has advantages of higher precision of limit for dicing, better effect of dicing, and lower noise.

A food processor with a dicing function, comprising a driving device and a dicing assembly; the dicing assembly includes a main body, a lid, a driving axle, an annular supporting body and a dicing knife component; the driving axle is disposed inside the main body the lid is disposed on an opening of the main body and a feeding channel is disposed on the lid, the annular supporting body is disposed inside the main body, and a mesh shaper is disposed on the annular supporting body; the dicing knife component is rotatably disposed on the annular supporting body and is coupling connected to the driving axle; wherein, the annular supporting body has an annular flange extending toward the lid in direction of a central axis of the driving axle, and a limiting groove is disposed on an inner surface of the annular flange; a radial outer end of the dicing knife component is capable of sliding inside the limiting groove.

In one embodiment, a convex rib, which is bulged-in, is disposed on an upper part of the inner surface of the annular flange, and the limiting groove is formed by the convex rib, the inner surface of the annular flange and an upper surface of the annular supporting body.

In one embodiment, the limiting groove has a first height H1, and the radial outer end of the dicing knife component has a first height H2, and 0<H1−H2≤2 mm.

In one embodiment, one or more knife-in troughs are disposed on an upper wall of the limiting groove, and the radial outer end of the dicing knife component adapts to enter into the limiting groove through the knife-in trough.

In one embodiment, a horizontal location of the knife-in trough avoids a horizontal location of the mesh shaper.

In one embodiment, a slanted knife-in face is disposed on an end of the upper wall of the limiting groove, and the end is approximate to the knife-in trough.

In one embodiment, a slanted into-groove face is disposed on an upper part of the radial outer end of the dicing knife component, and the slanted into-groove face intersects with an upper surface of the radial outer end of the dicing knife component at a certain angle.

In one embodiment, the dicing knife component comprises a connecting element coupling connected to an upper end of said driving axle, a straight knife body extending outwards from the connecting element along radial direction of the annular supporting body, and a rotating block disposed on a radial outer end of the straight knife body.

In one embodiment, the dicing knife component comprises two straight knife bodies radially extending from said connecting element along opposite directions.

In one embodiment, a knife handle is disposed on an upper end of the connecting element.

Compared to the prior art, with regard to the food processor with a dicing function provided in the present disclosure, the radial outer end of the dicing knife component is limited rotatably and radially because of the effect of the limiting groove of the annular flange. When dicing foods, along with the rotation of the dicing knife component, the foods are diced at the mesh shaper; when the mesh shaper shapes diced foods, the dicing knife component is moved upwards in the axial direction by axial force generated; and because of the limiting groove effect, the dicing knife component just can, taking the driving axle as a rotating axle, rotate limitedly in the limiting groove, thereby keeping a suitable clearance between the dicing knife component and the mesh shaper, so as to achieve a better dicing effect; meanwhile, since the limiting groove and the dicing knife component are integrated, the limiting groove and the dicing knife component can be manufactured together from a mould, thereby ensuring the precision of the height of the limiting groove, and avoiding defects of widely shaking and loudly noise generated due to a too large gap between the dicing knife component and the mesh shaper. The dicing knife component of the present disclosure is not able to move upwards, thereby an upwards pushing force to the lid will not be generated, and the lid will not be broken. Furthermore, with a simple structure of the annular supporting body, the food processor with a dicing function of the present disclosure is convenient to assembly, disassembly and wash.

Wherein, the demerits are denoted as follows

1 - - - Main body; 1A - - - Supporting platform flange; 2 - - - Lid;

2A - - - Feeding channel; 3 - - - Pushing bar; 4 - - - Driving axle;

7 - - - Dicing knife component; 7A - - - Straight knife body; 7B - - - Connecting element; 7C - - - Rotating block; 7D - - - Slanted into-groove face; 7E - - - Knife handle;

7F - - - Knife edge; 7G - - - Mating hole; 5 - - - Annular supporting body;

5A - - - Square opening; 5B - - - Annular flange; 5C - - - Limiting groove;

5D - - - Upper surface; 5E - - - Central hole; 5F - - - Knife-in trough;

5G - - - Convex rib; 5H - - - Slanted knife-in face; 6 - - - Mesh shaper.

PREFERRED EMBODIMENT OF THE INVENTION

In order to make the purpose, technical solutions and advantages of the present disclosure to be understood more clearly, the present disclosure will be described in further details with the accompanying drawings and the following embodiments. It should be understood that the specific embodiments described herein are merely examples to illustrate the disclosure, not to limit the present disclosure.

Embodiment One

Figure 1:
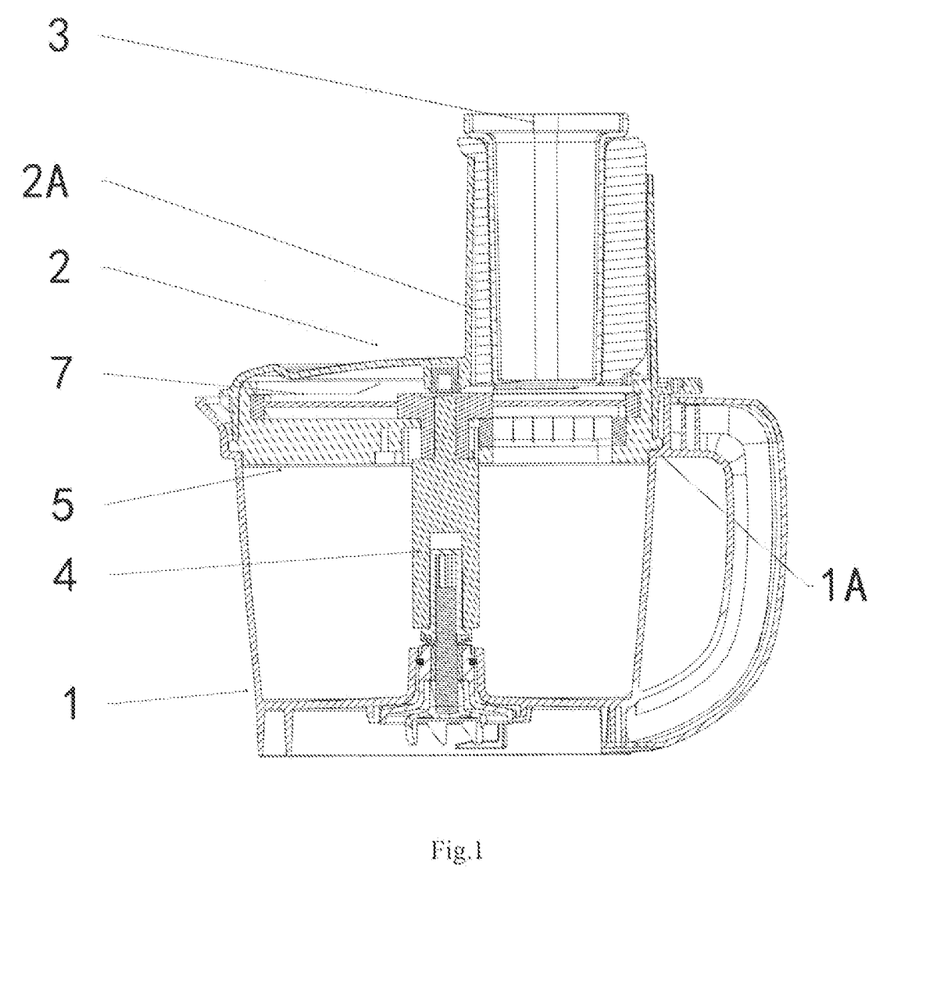
FIG. 1 is an assembly sectional view illustrating the food processor with a dicing function according to embodiment one of the present invention.
Figure 2:
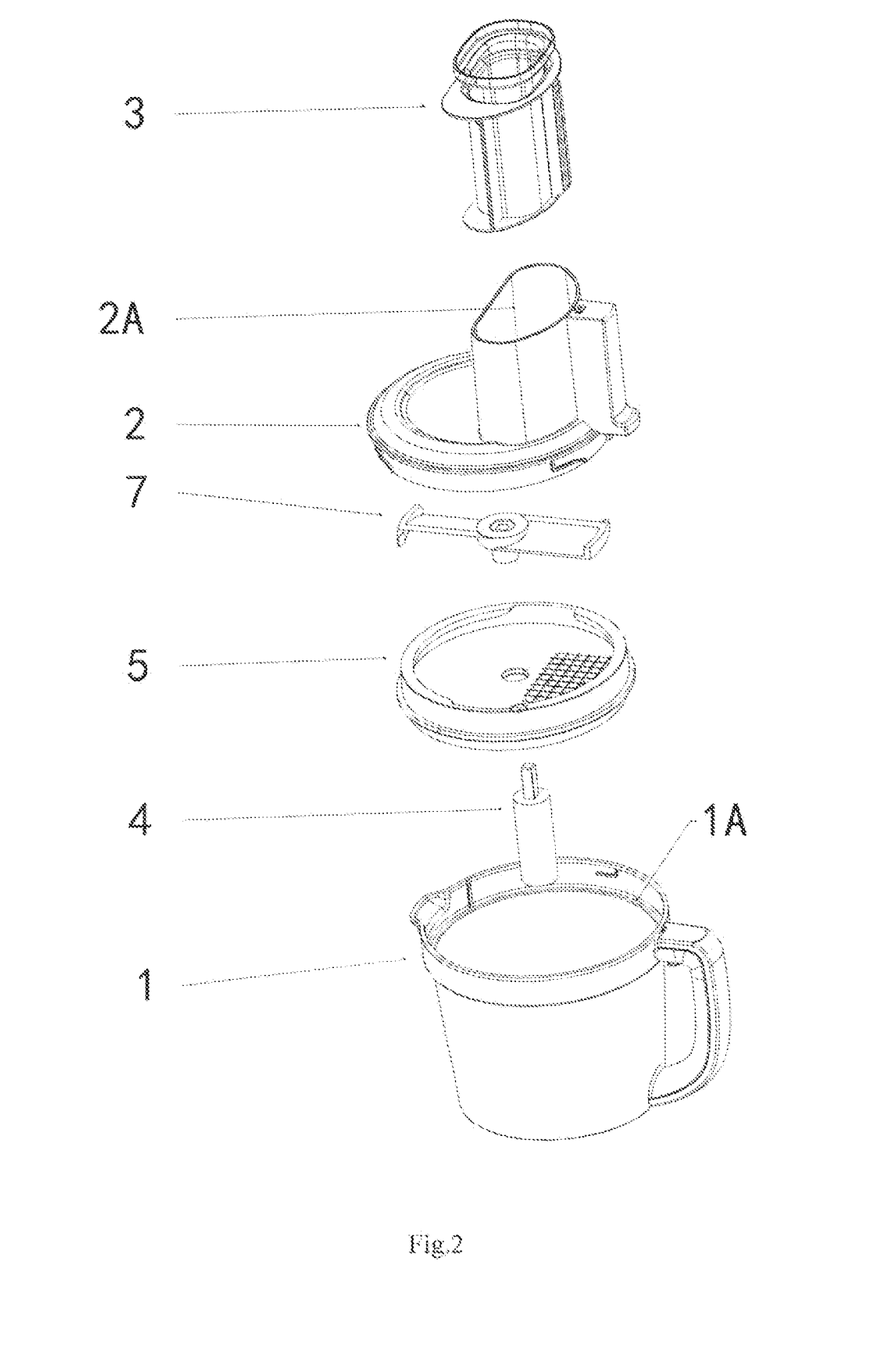
FIG. 2 is an explosive view illustrating the food processor with a dicing function as shown in FIG. 1.

As shown in FIGS. 1 and 2, the food processor with a dicing function according to embodiment one includes a driving device and a dicing assembly; the dicing assembly includes a main body 1, a lid 2, a pushing bar 3, a driving axle 4, an annular supporting body 5 and a dicing knife component 7; wherein the main body 1 disposed on the driving device is cup shaped, and an opening is disposed on the upper part of the main body for placing foods, and a supporting platform flange 1A is disposed on an inner wall of the opening of the mum body used for installing the annular supporting body 5. A mounting bracket is disposed on a bottom of the main body 1 for installing the driving axle 4. The driving axle 4 is disposed inside of the main body, and supported by the mounting bracket. The lid 2 is disposed on the opening of the main body, and a Feeding channel 2A is disposed on the lid.

Figure 3:
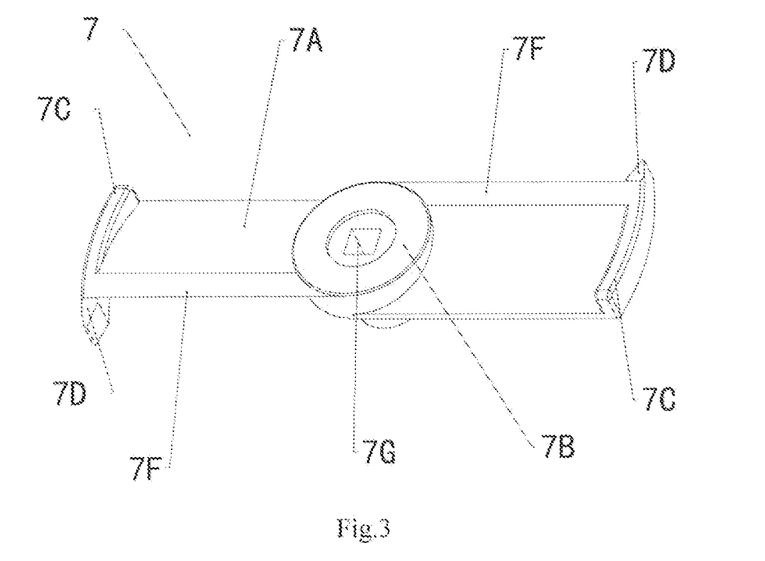
FIG. 3 is an appearance structure diagram illustrating the dicing knife component of the food processor with a dicing function as shown in FIG. 1.

As shown in FIG. 3, the dicing knife component 7 includes a connecting element 7B, a straight knife body 7A extending outwards from the connecting element 7B along radial direction of the annular supporting body 5, and as rotating block 7C (namely the radial outer end of the dicing knife component 7) disposed on a radial outer end of the straight knife body 7A, the straight knife body 7A has a knife edge 7F, a mating hole 7G, which is disposed on the connecting element 7B, is coupling connected to an upper end of the driving axle 4. The dicing knife component 7 disclosed in the embodiment one includes two straight knife bodies 7A radially extending from the connecting element 7B along opposite directions.

Figure 4:
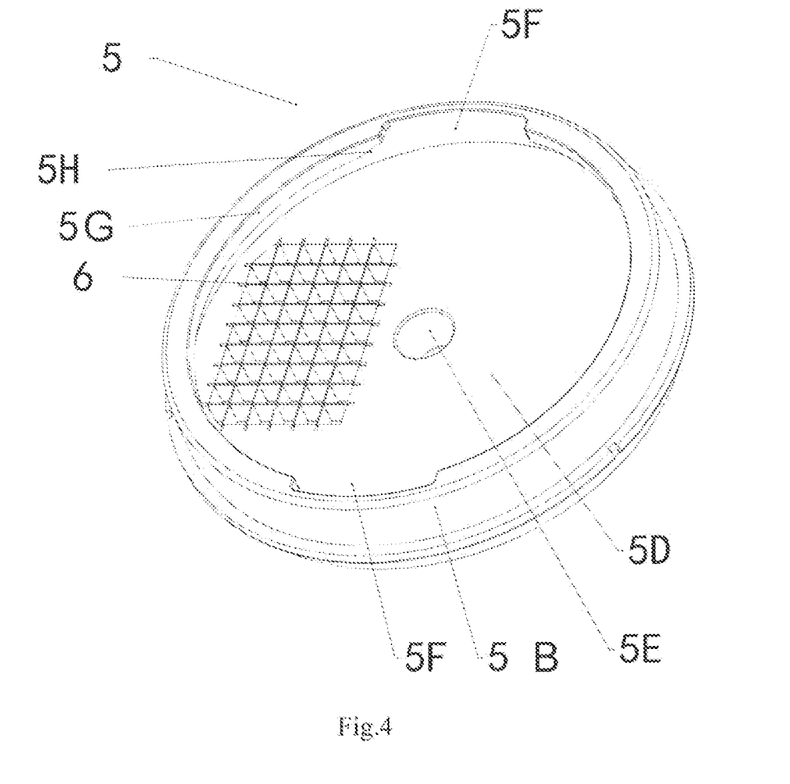
FIG. 4 is an appearance diagram illustrating the annular supporting body at the food processor with a dicing function as shown in FIG. 1, and the mesh shaper is directly fixed on the annular supporting body.
Figure 5:
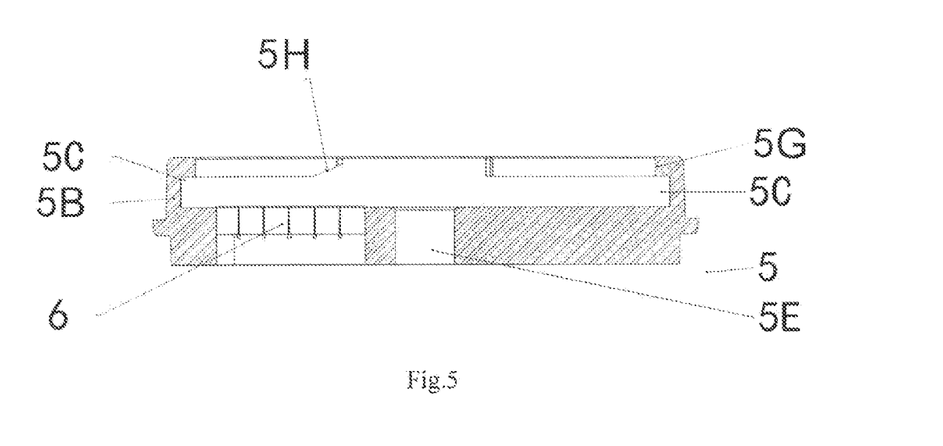
FIG. 5 is a sectional view illustrating the annular supporting body of the food processor with a dicing function as shown in FIG. 1.
Figure 6:
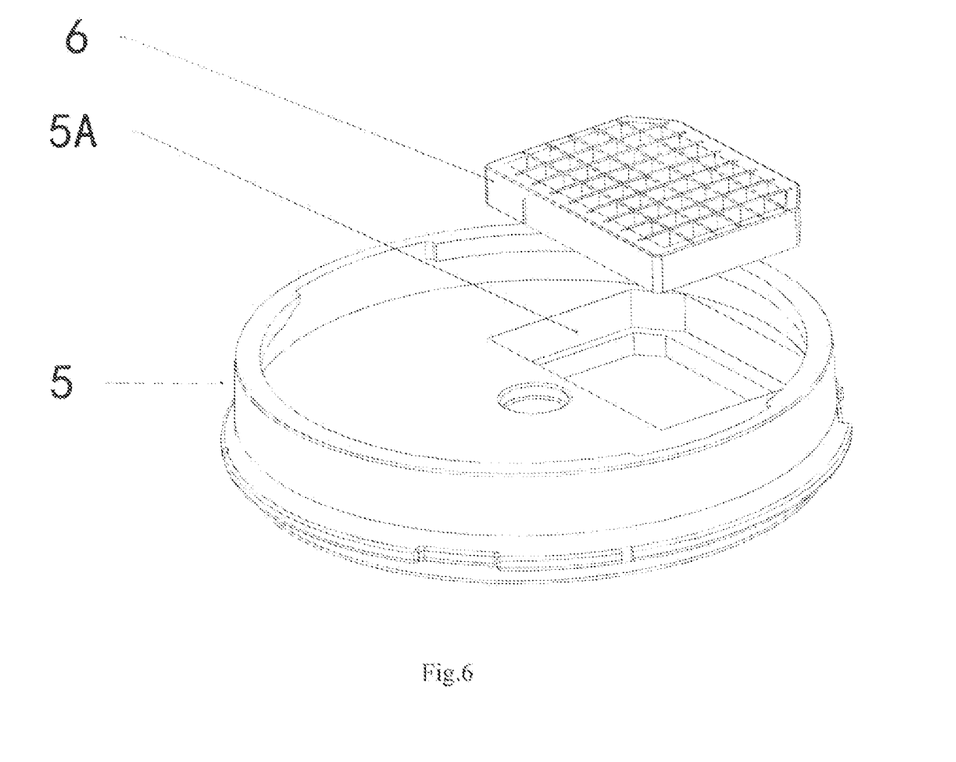
FIG. 6 is a schematic diagram illustrating the mesh shaper of the food processor with a dicing function as shown in FIG. 1, which is being removed out of the annular supporting body.

As shown in FIG. 4, FIG. 5 and FIG. 6, the annular supporting body 5 is placed at the opening of the main body 1, a central hole 5E is disposed on the centre of the annular supporting body 5 used for the driving axle 4 passing through; there is a square opening 5A provided inside the annular supporting body 5, and a mesh shaper 6 is removably placed inside the square opening 5A; or the mesh shaper 6 is directly fixed inside the annular supporting body 5. The annular supporting body 5 has an annular flange 5B extending towards the lid 2 in direction of central axis of the driving axle 4, and a limiting groove 5C is disposed on an inner surface of the annular flange 7. The connecting element 7B is connected to an end of the driving axle 4, and is rotated along with the rotation of the driving axle 4, thereby making the whole dicing knife component 7 rotating, so as to achieve the dicing effect; meanwhile, the rotating block is coordinately and rotatably limited into the limiting groove 5C of the annular supporting body 5, thereby achieving the effect of limiting the whole dicing knife component 7. Furthermore, since the limiting groove 5C of the annular supporting body 5 can be manufactured by the mould directly, the amplitude of the moving and shaking of the dicing knife component 7 can be maximumly ensured when rotating. Therefore, when cutting foods such as carrots, the foods are diced at the mesh shaper 6, meanwhile, the diced foods such as carrots, under effect of the slanted plane of the straight knife body 7A, generates a pushing force upwards to the dicing knife component 7; however, due to effect of the limiting groove, the upwards pushing force to the lid will not be generated, and effects of no shaking and lower noise are achieved.

Preferably, a convex rib 5G, which is bulged-in, is disposed on an upper part of the inner surface of the annular flange 5B, and the limiting groove 5C is formed by the convex rib 5G, the inner surface of the annular flange 5B and an upper surface of the annular supporting body 5. Furthermore, the annular flange 5G and the annular supporting body 5 are an integral construction.

Preferably, the limiting groove has a first height H1, and the rotating block 7C has a second height H2, and 0<H1−H2≤2 mm. The first height matches with the second height of the rotating block 7C of the dicing knife component 7, so as to make the rotating block 7C being able to rotate easily but no obviously moving being generated, thereby achieving effects of lower noise and smooth rotation.

Figure 7:
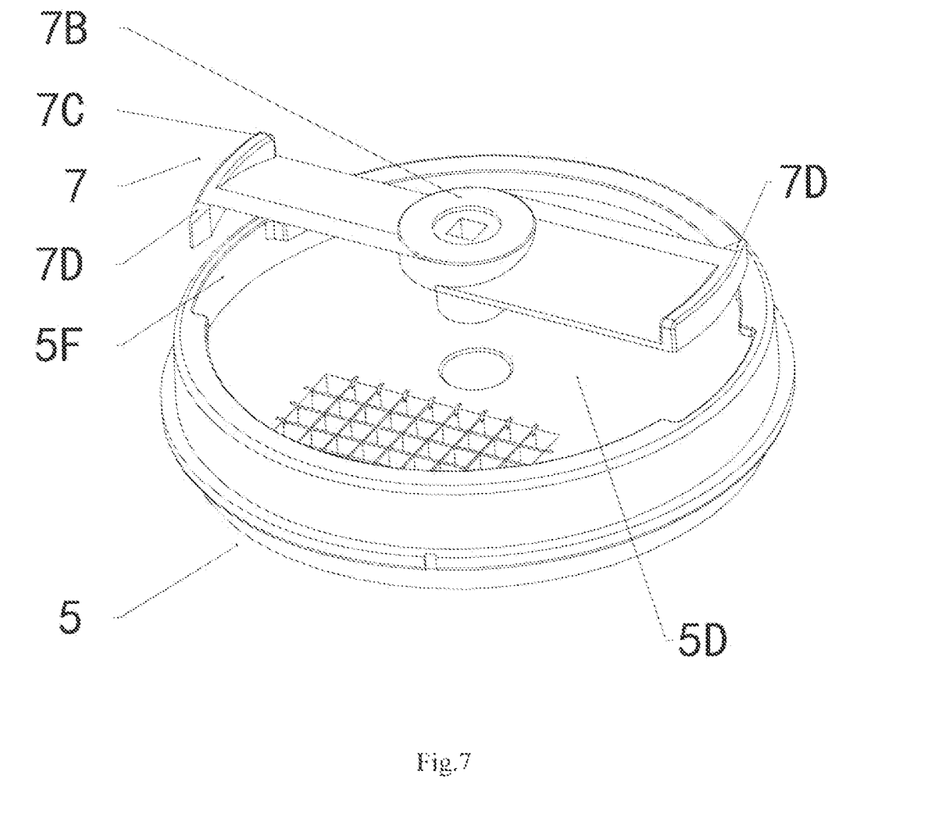
FIG. 7 and FIG. 8 are schematic diagrams illustrating the dicing knife component moving out of and into the knife-in trough respectively.
Figure 8:
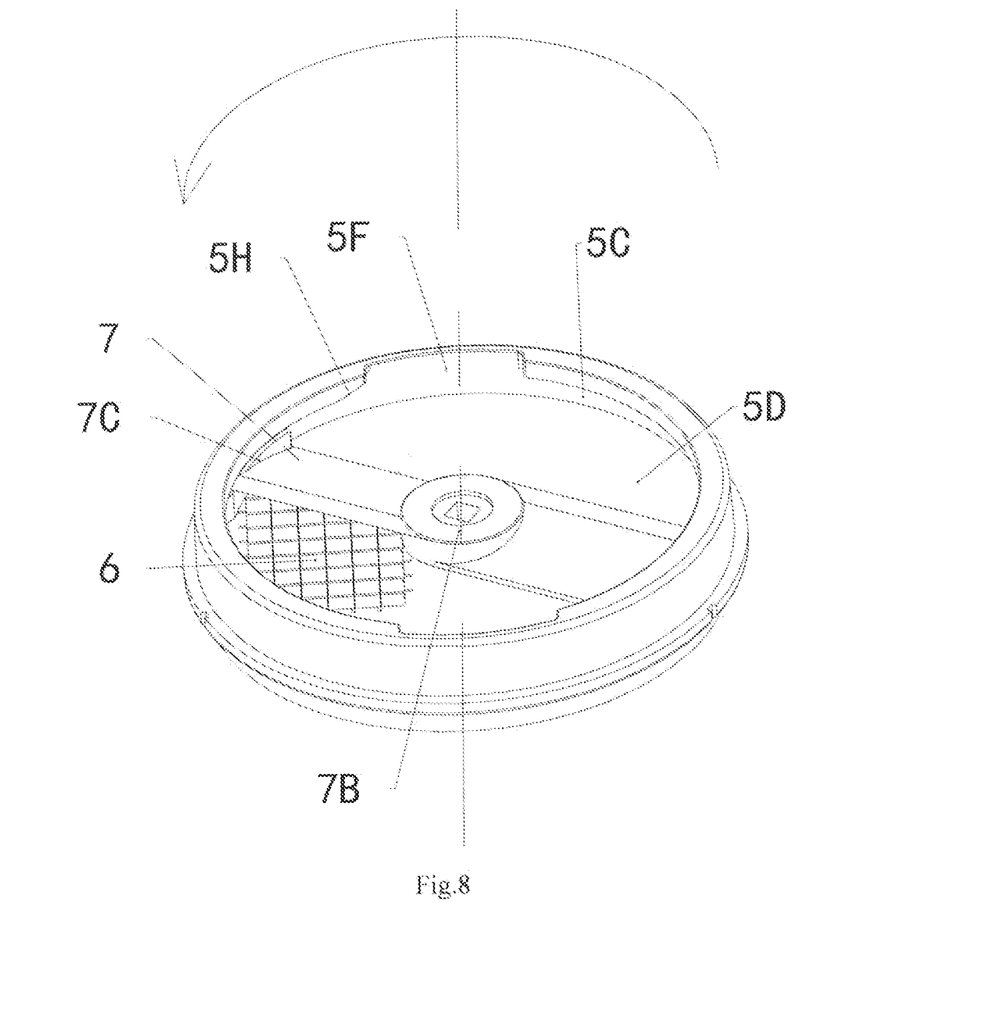

Preferably, one or more knife-in troughs 5F are disposed on an upper wall of the limiting groove 5C, and the rotating block 7C adapts to enter the limiting groove 7F through the knife-in troughs 5C. As shown in FIG. 7 and FIG. 8, when dicing foods, the rotating block 7C of the dicing knife component 7 aligns the corresponding knife-in trough 5F of the annular supporting body 5, so as to be entirely placed into the annular supporting body 5, thereby executing process of dicing foods. Meanwhile, when the process of dicing foods is completed, the dicing knife component 7 just requires to be rotated to align the knife-in trough 5F, and then be lifted, thereby convenient to wash. In addition, when rotating the dicing knife component 7, the driving axle 4 can be rotated simultaneously, so as to rotate the dicing knife component 7 to the corresponding knife-in trough 5F, thereby lifting the dicing knife component 7.

Preferably, a horizontal location of the knife-in trough 5F avoids a horizontal location of the mesh shaper 6. When the food processor is working, the rotating block 7C of the dicing knife component 7 is rotated to the position of the mesh shaper 6 to dice foods; since the mesh shaper 6 suffers the pushing force before foods are cut into dices, the dicing knife component 7 suffers the upwards pushing force, and the knife-in trough 5F on the annular supporting body 5 avoids the location of the mesh shaper 6, thereby ensuring the rotating block 7C on the dicing knife component 7 is limited by the limiting groove 5C; and the dicing knife component 7 will not move up and down, thereby ensuring the dicing effect of the food processor with a dicing function.

Preferably, a slanted knife-in face 05H is disposed on an end of the knife-in trough, the end is towards the rotating direction of the dicing knife component 07, and the slanted knife-in face intersects with a top surface of the limiting groove 5C. When the food processor with a dicing function works, there is no limit above the dicing knife component 7, when the rotating block 7C of the dicing knife component 7 rotates to the position of the knife-in trough 5F therefore, the dicing knife component 7 may have possibility of moving upwards at a tiny size in axial direction because of cutting foods or other reasons. Since the knife-in trough 5F has one slanted plane of cutting feed 5H, and connects with the top surface of the limiting groove 5C, a front end of the rotating block 7C of the dicing knife component 7 will rotate into the limiting groove 5C soon and be limited by the limiting groove 5C, thereby ensuring the dicing knife component 7 being locked by knife-in trough.

Preferably, a slanted into-groove face 7D is disposed on an upper end of the rotating block 7C, the end is towards the rotating direction of the dicing knife component 07, and the slanted into-groove face 7D intersects with an upper surface 5D of the rotating block 7C at a certain angle. The effect is: when the rotating block 7C of the dicing knife component 7 rotates to the knife-in trough 5F of the annular supporting body 5, the slanted into-groove face 7D on the rotating block 7C can take a better transition and connection effect.

Embodiment Two

Figure 9:
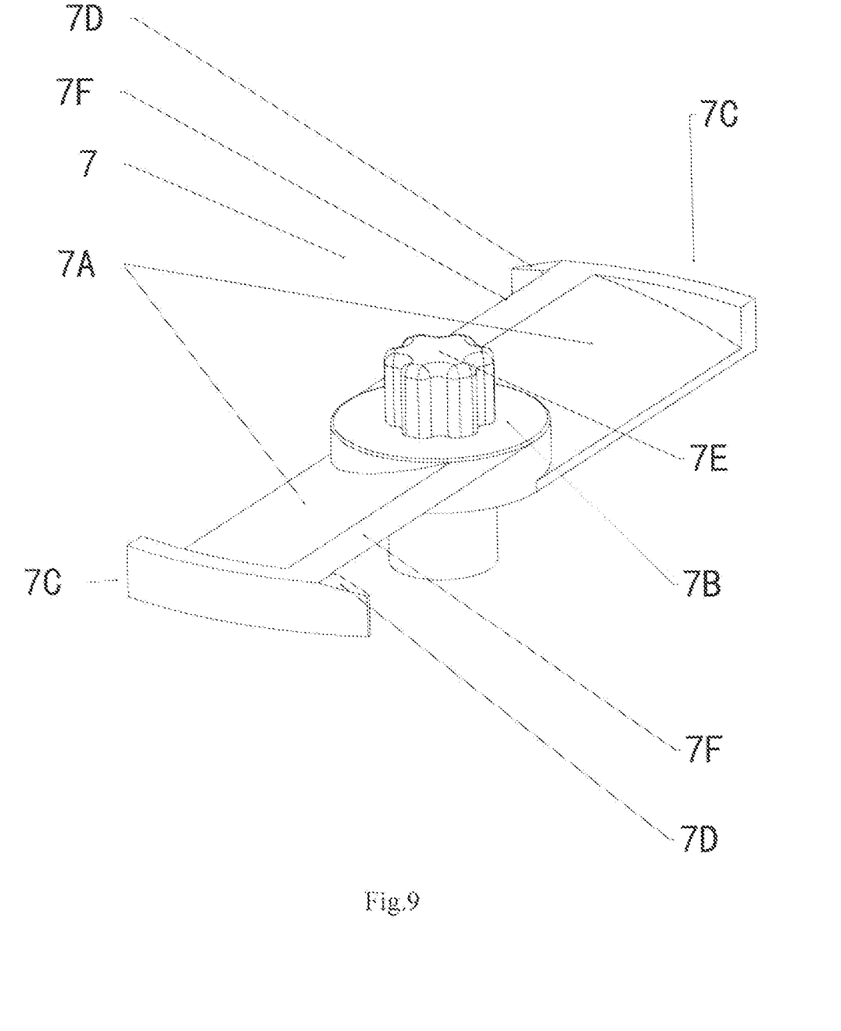
FIG. 9 is an appearance structure diagram illustrating the dicing knife component of the food processor with a dicing function according to embodiment two of the present invention.

As shown in FIG. 9, the food processor with a dicing function in the embodiment two is different from which in the embodiment one; and the differences are: a knife handle 7E is disposed on the connecting element 7B of the dicing knife component 7, which is convenient to lift the dicing knife component 7 from the knife-in trough 5F of the annular supporting body 5. When the working is completed, the knife handle 7E just requires to be rotated, so as to align the dicing knife component 7 to the knife-in trough 5F, and then lift the dicing knife component 7, thereby convenient to wash. In addition, when rotating the dicing knife component 7, the driving axle 4 can be rotated simultaneously, thereby rotating the dicing knife component 7 to the corresponding knife-in trough 5F, and lifting the dicing knife component 7.

It should be understood by those skilled in the art that what described above are preferred embodiments of the present invention. Various modifications and replacements may be made therein without departing from the theory of the present disclosure, and should also be seen in the scope of the present disclosure.

What is claimed is:

1. A food processor with a dicing function, comprising:
   a driving device and a dicing assembly; said dicing assembly comprises a main body, a lid, a driving axle, an annular supporting body and a dicing knife component; said driving axle is disposed inside the main body, said lid is disposed on an opening of said main body, and a feeding channel is disposed on said lid, said annular supporting body is disposed inside said main body, and a mesh shaper is disposed on said annular supporting body; said dicing knife component is rotatably disposed on said annular supporting body and is coupled to said driving axle;
   wherein, said annular supporting body has an annular flange extending towards the lid in direction of a central axis of said driving axle, and a limiting groove is disposed on an inner surface of said annular flange;
   wherein a radial outer end of said dicing knife component is slidingly disposed inside said limiting groove; and
   wherein one or more knife-in troughs are disposed on an upper wall of said limiting groove, and the radial outer end of said dicing knife component is adapted to enter said limiting groove through the knife-in trough.

2. The food processor with a dicing function according to claim 1, wherein, a convex rib, which is bulged-in, is disposed on an upper part of the inner surface of said annular flange, and said limiting groove is formed by said convex rib, the inner surface of said annular flange and an upper surface of said annular supporting body.

3. The food processor with a dicing function according to claim 2, wherein, said dicing knife component comprises a connecting element coupling connected to an upper end of said driving axle, a straight knife body extending outwards from said connecting element along radial direction of said annular supporting body, and a rotating block disposed on a radial outer end of said straight knife body.

4. The food processor with a dicing function according to claim 1, wherein, said limiting groove has a first height H1, and the radial outer end of said dicing knife component has a second height H2, and $0 < H1 - H2 \leq 2$ mm.

5. The food processor with a dicing function according to claim 4, wherein, said dicing knife component comprises a connecting element coupling connected to an upper end of said driving axle, a straight knife body extending outwards from said connecting element along radial direction of said annular supporting body, and a rotating block disposed on a radial outer end of said straight knife body.

6. The food processor with a dicing function according to claim 1, wherein, a horizontal location of the knife-in trough avoids a horizontal location of said mesh shaper.

7. The food processor with a dicing function according to claim 6, wherein, said dicing knife component comprises a connecting element coupling connected to an upper end of said driving axle, a straight knife body extending outwards from said connecting element along radial direction of said annular supporting body, and a rotating block disposed on a radial outer end of said straight knife body.

8. The food processor with a dicing function according to claim 1, wherein, a slanted knife-in face is disposed on an end of the upper wall of said limiting groove, and said end is approximate to the knife-in trough.

9. The food processor with a dicing function according to claim 8, wherein, said dicing knife component comprises a connecting element coupling connected to an upper end of said driving axle, a straight knife body extending outwards from said connecting element along radial direction of said annular supporting body, and a rotating block disposed on a radial outer end of said straight knife body.

10. The food processor with a dicing function according to claim 9, wherein, said dicing knife component comprises two straight knife bodies radially extending from said connecting element along opposite directions.

11. The food processor with a dicing function according to claim 9, wherein, a knife handle is disposed on an upper end of said connecting element.

12. The food processor with a dicing function according to claim 1, wherein, a slanted into-groove face is disposed on an upper part of the radial outer end of said dicing knife component, and said slanted into-groove face intersects with an upper surface of the radial outer end of said dicing knife component at a certain angle.

13. The food processor with a dicing function according to claim 12, wherein, said dicing knife component comprises a connecting element coupling connected to an upper end of said driving axle, a straight knife body extending outwards from said connecting element along radial direction of said annular supporting body, and a rotating block disposed on a radial outer end of said straight knife body.

14. The food processor with a dicing function according to claim 13, wherein, said dicing knife component comprises two straight knife bodies radially extending from said connecting element along opposite directions.

15. The food processor with a dicing function according to claim 13, wherein, a knife handle is disposed on an upper end of said connecting element.

16. The food processor with a dicing function according to claim 1, wherein, said dicing knife component comprises a connecting element coupling connected to an upper end of said driving axle, a straight knife body extending outwards from said connecting element along radial direction of said annular supporting body, and a rotating block disposed on a radial outer end of said straight knife body.

17. The food processor with a dicing function according to claim 16, wherein, said dicing knife component comprises two straight knife bodies radially extending from said connecting element along opposite directions.

18. The food processor with a dicing function according to claim 16, wherein, a knife handle is disposed on an upper end of said connecting element.

* * * * *